(12) United States Patent
Clarke

(10) Patent No.: US 6,752,950 B2
(45) Date of Patent: Jun. 22, 2004

(54) TWO SHOT MOLDING METHOD AND FASTENER CLIP WITH SEAL MADE THEREBY

(75) Inventor: Martin D. H. Clarke, Aurora (CA)

(73) Assignee: Illinois Tool Works Inc., Glenview, IL (US)

(*) Notice: Subject to any disclaimer, the term of this patent is extended or adjusted under 35 U.S.C. 154(b) by 156 days.

(21) Appl. No.: 10/087,215

(22) Filed: Mar. 4, 2002

(65) Prior Publication Data
US 2003/0159256 A1 Aug. 28, 2003

(51) Int. Cl.[7] .............................................. B29C 45/16
(52) U.S. Cl. ..................... 264/255; 264/273; 264/279; 264/328.8; 264/328.11
(58) Field of Search .................................. 264/255, 273, 264/279, 328.11, 328.8, 238, 318

(56) References Cited

U.S. PATENT DOCUMENTS

| | | | |
|---|---|---|---|
| 2,941,439 A | * | 6/1960 | Rapata ........................ 411/41 |
| 3,249,973 A | | 5/1966 | Seckerson |
| 3,822,107 A | * | 7/1974 | Wogerer ...................... 264/245 |
| 4,238,446 A | * | 12/1980 | Tanaka ........................ 264/250 |
| 4,571,134 A | | 2/1986 | Beglinger et al. |
| 4,687,434 A | * | 8/1987 | Beglinger ................. 264/328.1 |
| 4,726,758 A | * | 2/1988 | Sekine et al. ............. 264/328.8 |
| 5,094,602 A | * | 3/1992 | Morita ..................... 264/328.8 |
| 5,271,880 A | * | 12/1993 | Lindsay ....................... 264/255 |
| 5,647,713 A | | 7/1997 | Ge et al. |
| 5,922,263 A | * | 7/1999 | Endo et al. .................. 264/255 |

* cited by examiner

Primary Examiner—Jill L. Heitbrink
(74) Attorney, Agent, or Firm—Lowe Hauptman Gilman & Berner LLP

(57) ABSTRACT

A two shot molding method is provided to make a fastener device having a fastener portion and integral seal portion of different material. The fastener device includes a fastener part having a plastic head and anchor stem with prongs and a flexible seal of different material integral with the fastener part and the two molded together in a two-shot molding technique.

3 Claims, 6 Drawing Sheets

TWO SHOT MOLDING METHOD AND FASTENER CLIP WITH SEAL MADE THEREBY

FIELD OF INVENTION

The invention relates to a two shot molding method which can be used to make a fastener device having a fastener portion and integral seal portion of different material. More particularly, the invention relates to a fastener device comprising a fastener part having a plastic head and anchor stem with prongs and a flexible seal of different material integral with the fastener part and the two molded together in a two-shot molding technique.

BACKGROUND OF THE INVENTION

More parts of vehicles, particularly trim parts, are being formed of molded plastic which trim parts are secured to portions of the vehicle body through fastener devices. A typical trim pad mounting fastener is that shown in U.S. Pat. No. 3,249,973 of Seckerson wherein there is provided a fastener with a stud formed from a moldable material so as to have a head and a snap-engaging stem or prong extending therefrom. The head has a substantially circular sealing flange adjacent the stem and a retaining flange spaced along the length of the head from the main flange. The stem has means such as being shouldered and slotted, whereby the stem may be flexed when inserted into an aperture and return to its normal configuration to secure the fastener in the aperture. The sealing flange is in the form of a skirt which is dished and concave towards the stem thereby exhibiting a certain degree of resiliency. When the fastener is properly located in securing a trim pad, the skirt is flattened against the outer surface of the panel to form a seal around the aperture.

However, one of the problems of the type of fastener exemplified by Seckerson is that the sealing flange which is in the shape of a skirt, is molded of the same material as the other parts of the head and the stem.

Often the material used for fabricating strength and rigidity into the retaining flange and the stem is not the most advantageous for producing a sealing flange for the purposes of sealing an aperture and thus the sealing flange fails in its objective to act as an effective seal even when there is some resiliency about its periphery.

Attempts have been made to formulate seals of separate material, the seal material being more effective as a seal, but this requires a step of connecting the seal with the fastener prior to use. If this is done in the shop, there is a problem with the seals becoming separated from the fastener stem during shipping and handling. In the alternative, it is too labour intensive to connect the seals with the fastener just before installation. Indeed with today's modern assembly techniques, it is difficult to visually check on whether each fastener has a seal on it before it is used.

Accordingly, it would be advantageous to provide a fastener device adapted for securing molded trim which has a seal integral with the head and stem but of a material which enhances the sealing capabilities of the seal portion and is not of the same material as the other more rigid parts of the head and of the stem. Further, it would be advantageous to have a fastener device wherein its securing aspects and its sealing capabilities are each provided with materials which enhance their respective functional purposes.

Still further, it will be advantageous to be able to mold a device, the fastener device only being one exemplary device possible, having parts of different material wherein the molding takes place in at least a two step process wherein a portion of the device is molded first and the second or subsequent parts are molded in the same mold, using the molded first part as, a conduit of material or to define part of the shape or configuration of the second part.

SUMMARY OF THE INVENTION

The invention in one broad aspect pertains to a method of fabricating a device having at least two parts molded of different materials, comprising providing a mold cavity having at least three cavities, a first cavity defining a configuration of a first part of the device, a second cavity defining a configuration of a second part of the device and a third cavity defining a configuration of a third part of the device, the cavities initially being in flow communication with each other with flow communication between the first and third cavities being through the second cavity. The first and third cavities are temporarily closed off from the second cavity including closing flow communication between the first and third cavities. A first material is injected into the second cavity to mold the second part of the device and then flow communication between the first and third cavities is opened. A second material is injected into the first and third cavities, the second material flowing between the first and third cavities through at least one portion of the second part of the device as molded wherein the at least one portion of the second part effectively defines a passageway for the flow of second material between the first and second cavities to form the first and third parts of the device. The device is from the mold cavity whereby the device as molded has parts of different materials molded sequentially together.

More particularly, the invention comprehends molding a fastener device comprising a molded rigid fastener part and a molded seal part, the rigid fastener part having a head, a fastening element for fastening association with an aperture and a neck intermediate the head and the fastening element. The seal part has a collar portion surrounding the neck and a flexible skirt portion extending radially outwardly from the collar portion. The seal part is of a material different from the material of the rigid fastener part and the neck is formed within and is substantially covered by the collar.

Preferably, the method is used to fabricate a fastener device wherein the fastener device comprises a head portion, a neck portion and a fastening element, and a seal portion, the seal portion being molded of the first material in the second cavity and the head portion and the fastening element being molded of the second material in the first and third cavities, the neck portion being formed of the second material within and defined by a collar part of the seal portion.

The invention also pertains to a fastener device and method of manufacture, the device having a rigid fastener part and a seal part attached thereto, the seal being preferably of a different material to that of the clip. The fastener part has a head portion integrally connected with a prong or stem portion through a neck. In a two shot molding technique, the seal part is molded first and the rigid fastener part is molded subsequently in such fashion that the seal part is properly located and permanently connected to the rigid part of the fastener device. Preferably the seal is molded with a cylindrical collar and the fastening element is molded by injecting material to form the prong or stem through the collar. The collar surrounds the neck of the fastening element in the final form of the fastener.

Although the fabrication method has been particularized herein with respect to making a fastener device, it will be appreciated that the molding technique can be used to fabricate other devices which have parts of different material wherein part of the device is molded first and the other part or parts of the device are molded using at least a portion of the already molded first part as a conduit or passageway in molding portions of the second part. In other words, the first part effectively defines at least a portion of the mold cavity of the second part.

Other aspects of the invention will become evident from a review of the preferred embodiments of the invention setforth hereinafter.

DESCRIPTION OF A PREFERRED EMBODIMENT OF THE INVENTION

Figure 1:
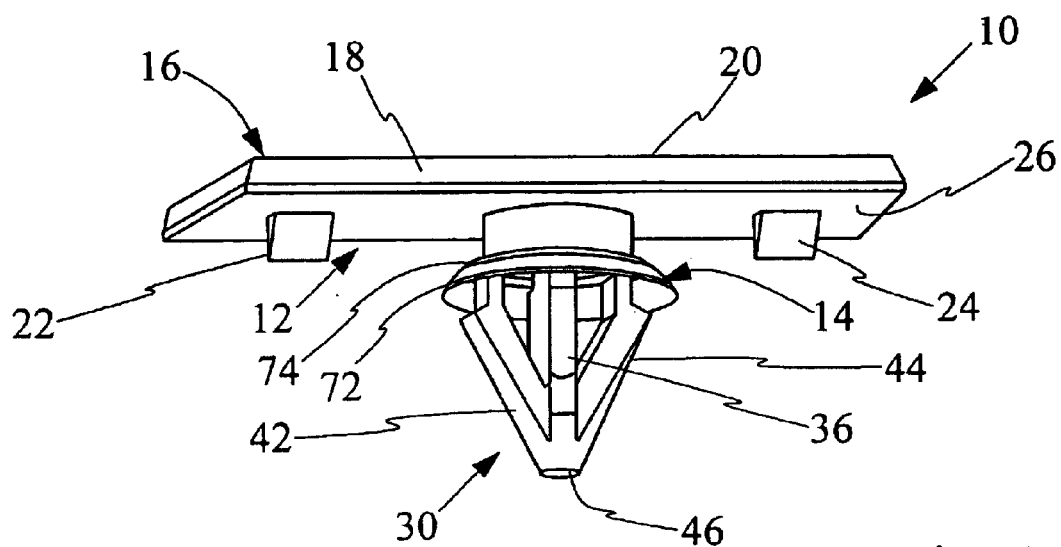
FIG. 1 is a perspective view from below of the fastener device of the invention as a completed part.
Figure 2:
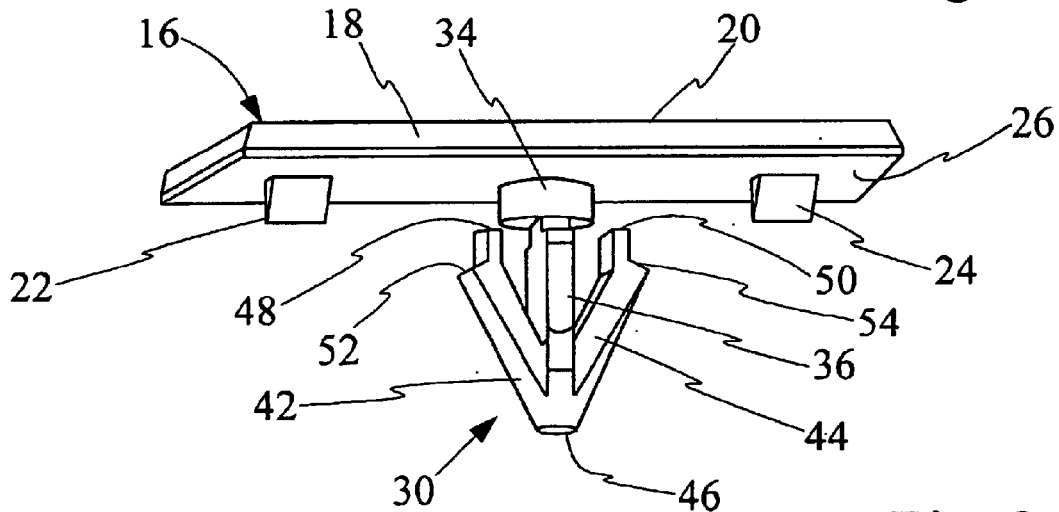
FIG. 2 is a perspective view from below, similar to FIG. 1 but with only the rigid fastener part of the fastener device including the head and stem portion.
Figure 3:
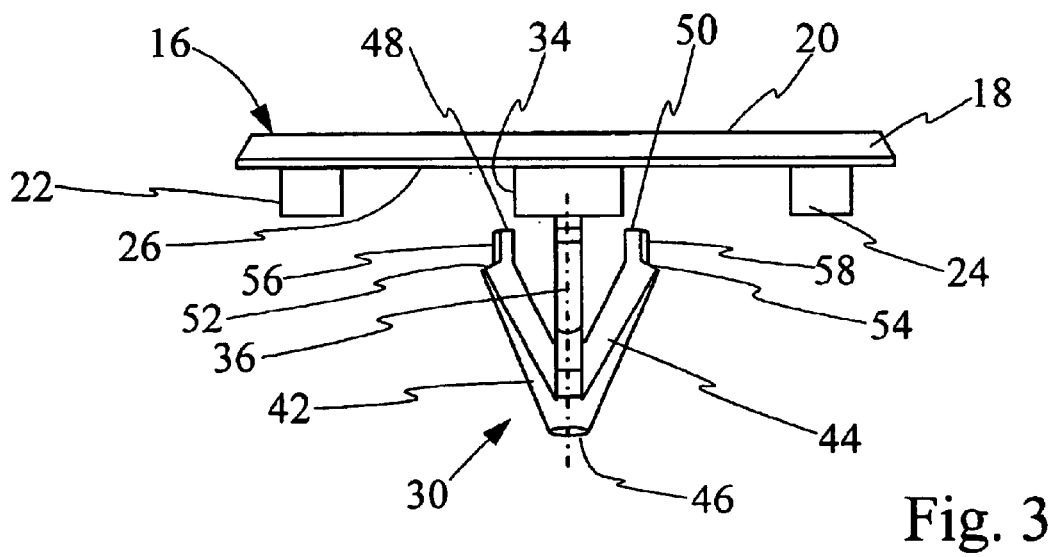
FIG. 3 is a side view of the rigid fastener part as shown in FIG. 2.
Figure 4:
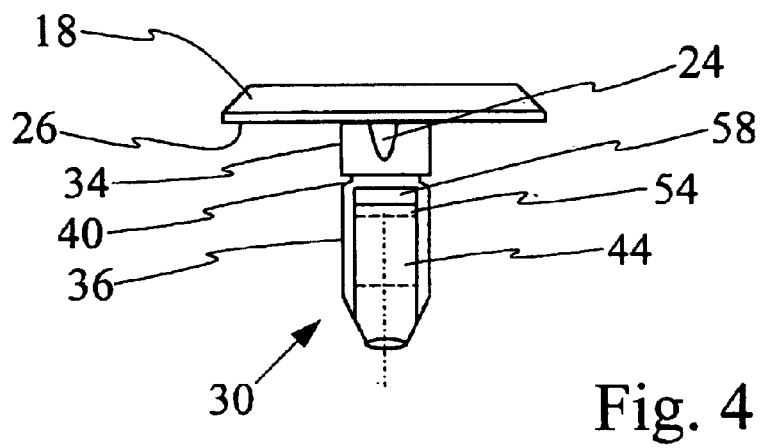
FIG. 4 is an end view of the rigid fastener part as shown in FIG. 2.
Figure 5:
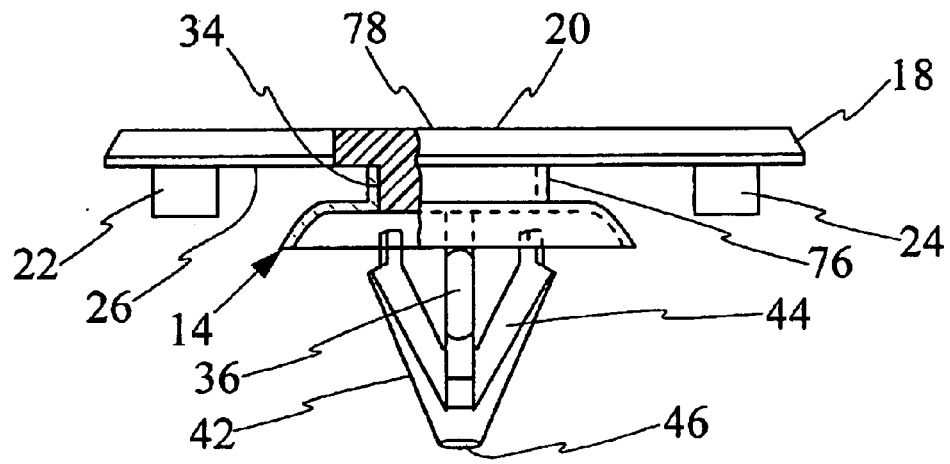
FIG. 5 is a side view, partly in section, of the fastener device of FIG. 1.
Figure 6:
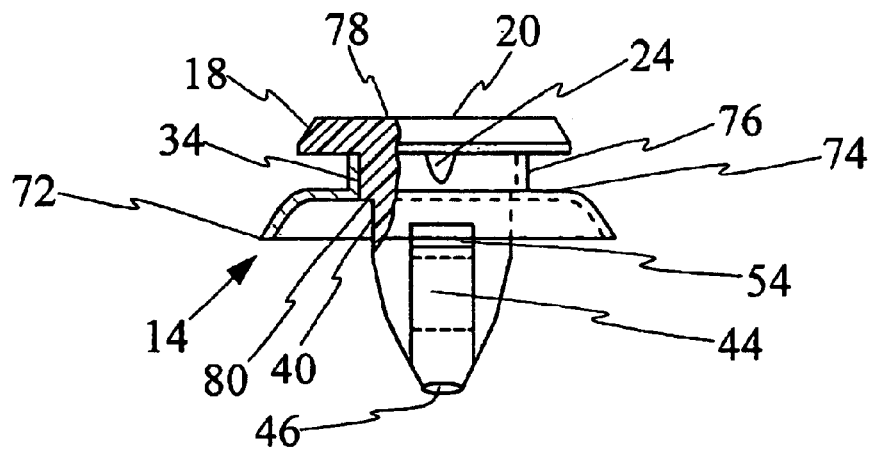
FIG. 6 is an end view, partly in section, of the fastener device of FIG. 1.
Figure 7:
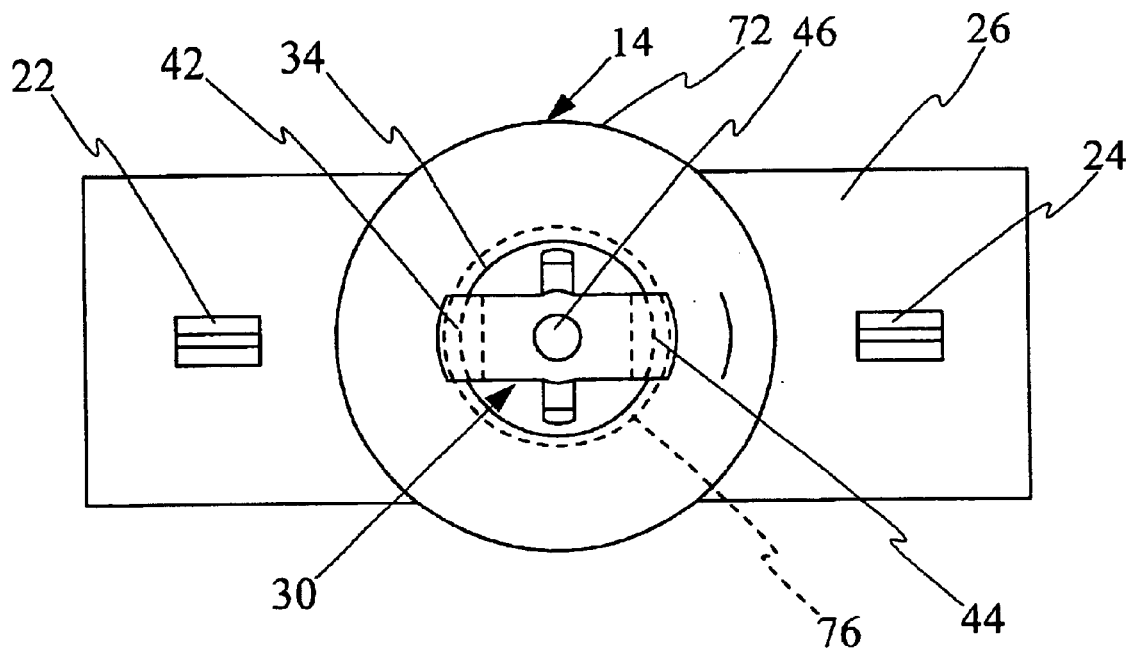
FIG. 7 is a bottom view of the fastener device of FIG. 1.

Turning to FIGS. 1–7, there is shown a fastener device 10 having a rigid fastener part 12 and a seal 14. The rigid fastener part 12 has an elongated rectangular head or retaining flange 16 having a chamfered peripheral edge 18 and top surface 20. Two fastener locating pips or pins 22 and 24 of generally triangular configuration in end view extend from the bottom 26 of head 16. As best seen in FIGS. 2–4, stem 30 of fastener part 12 is integrally connected with the bottom 26 of head 16 through cylindrical neck 34. Stem 30 has a central arrowhead-shaped portion 36 integrally connected to cylindrical neck 34 through rectangular neck portion 38. The width of the upper end 40 of arrowhead-shaped portion 36 is substantially the diameter of the aperture or hole to which the fastener is to be associated.

At right angles to arrowhead shaped portion 36 are two prong elements 42, 44 of mirror image configuration, the prong elements 42, 44 being integrally molded to extend upwardly from the distal end 46 of arrowhead-shaped portion 36 to respective upper ends 48 and 50. Ends 48 and 50 have stepped or shouldered portions 52, 54 as particularly seen in FIGS. 2 and 3. Prongs 40, 42 are molded such as to flex inwardly slightly when the fastener is inserted into the aperture with which the fastener is to be associated and the stepped portions 52, 54 snap into position on the periphery of the aperture to secure the fastener in position. Projecting portions 56 and 58 of prong ends 46, 48 are located within the aperture and thus reduce or eliminate lateral movement of the fastener within the aperture as does the upper end 40 of arrowhead-shaped portion 36.

FIGS. 1 and 5–7 also show circular flexible seal 14 which has a somewhat umbrella or skirt configuration with outer peripheral edge 72 and upper portion 74. Seal 14 has a cylindrical collar 76 which surrounds neck 34 of fastener part 12 and extends upwardly to the bottom 26 of head 16. It will also be apparent from FIG. 6, which is partly in section, that there is a small shoulder 80 between the periphery of neck and inner periphery 74 of collar 76 and upper end 40, arrowhead shaped portion 36 so that a small gap is provided between the axial plane of inner periphery 74 of collar 76 and end portion 40, to which reference will be made further herein.

Figure 8:
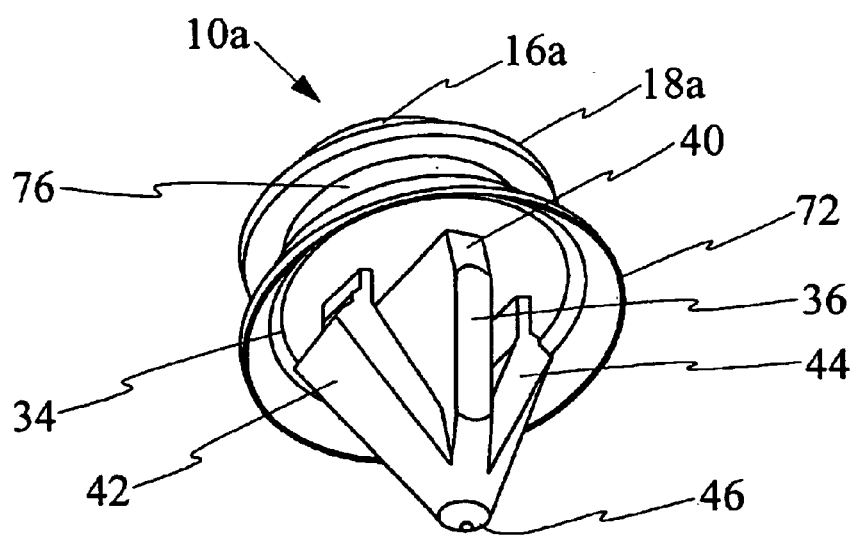
FIG. 8 is a perspective view of a fastener device with a different shaped head than that shown in FIG. 1.
Figure 9:
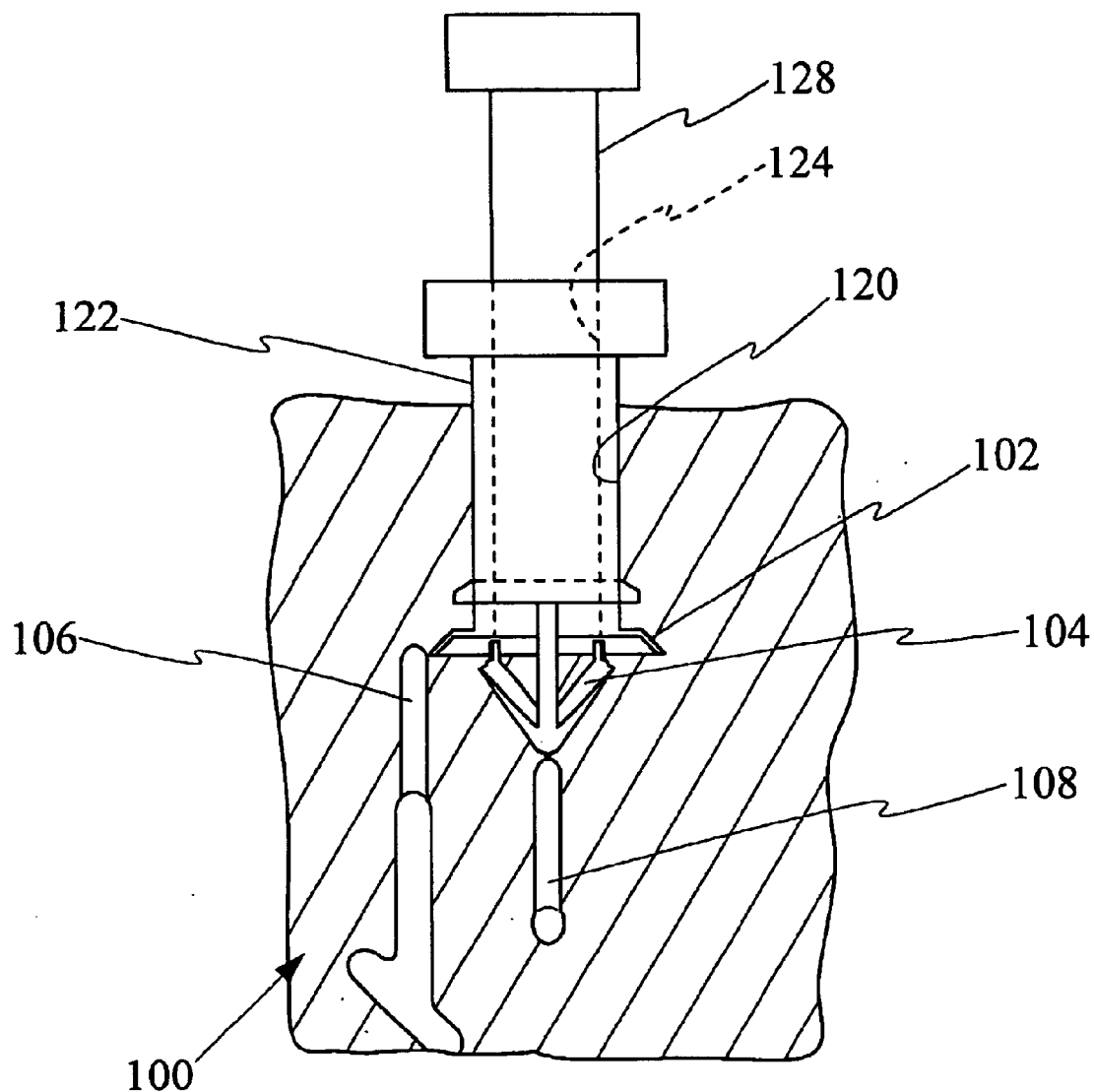
FIG. 9 is a schematic illustration of a mold for performing a two-step/shot molding of the fastener device.

FIG. 8 shows another embodiment of the fastener device designated 10a which is similar to the device shown in FIGS. 1–7 with the noted exception that head 16a is circular. Otherwise, the device 10a is fashioned similar to and molded similarly to the embodiment of FIGS. 1–7 and parts of device 10a which are the same as those in the embodiment of FIGS. 1–7 have been designated with the same reference number.

In fabricating the fastener devices 10 and 10a, a two-shot or two step molding technique is used. Turning to FIGS. 9–12, the mold 100 comprising at least two parts, only one of which is schematically shown, has a seat forming cavity 102 and fastener forming cavity 104 to define fastener device 10 (or 10a), with the usual ducts or conduits 106 and 108, duct 106 permitting material for forming flexible seal 14 to be injected into cavity 102 and duct 108 permitting material for forming rigid fastener 12 to be injected into fastener cavity 104. The usual vents and other standard conduits necessary for molding are not shown for the purposes of clarity. Mold 100 also has bore 120 adapted to permit outer core pin 122 to slide within bore 120. Outer core pin 122 has an inner bore 124 adapted to permit inner core pin 128 to slide therein. Movement of core pins 122 and 128 is individually controlled hydraulically as part of the molding process and the selective control of molding core pins is known in the technology and therefore further details of the control system is not shown or set forth.

Figure 10:
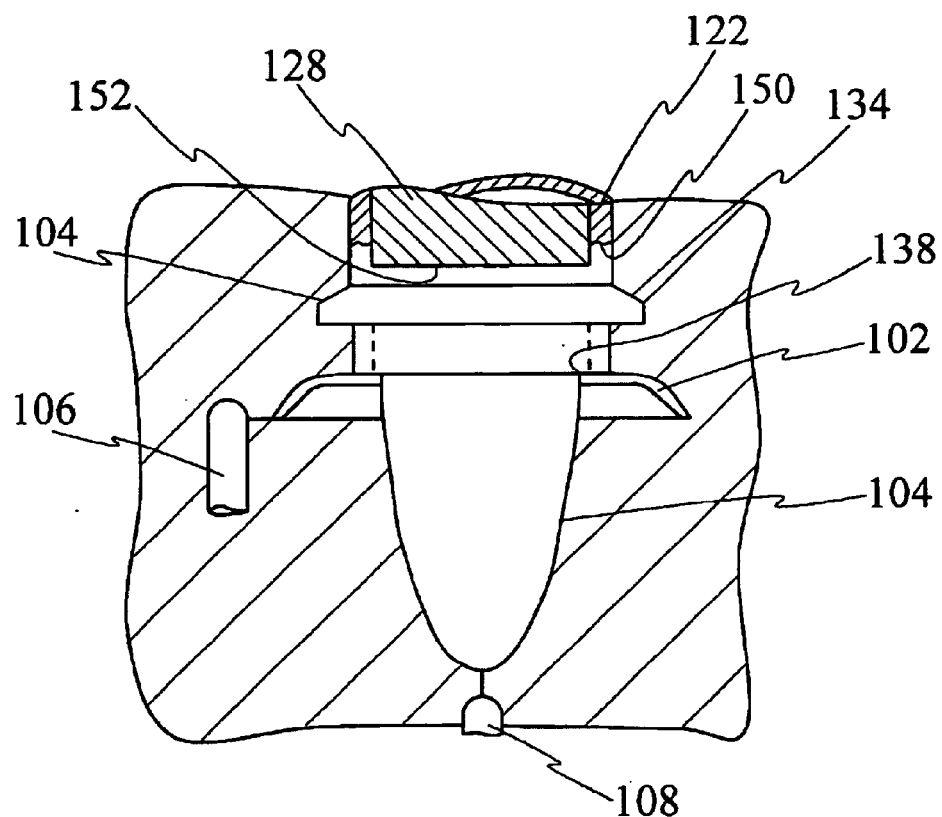
FIG. 10 is an enlarged view of the mold cavity of FIG. 9.
Figure 11:
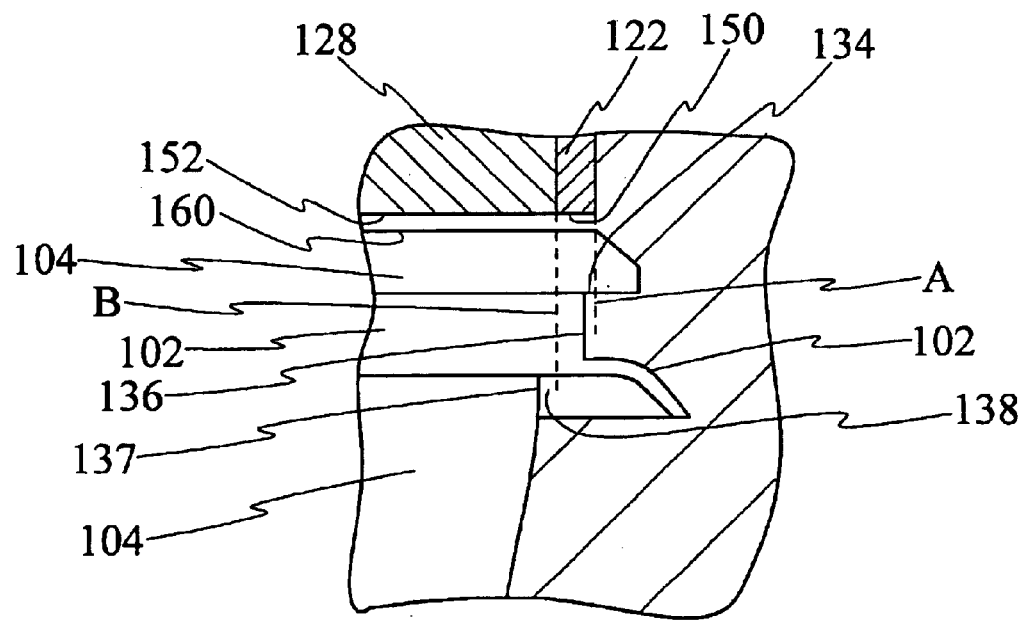
FIG. 11 is an enlarged view of part of the mold cavity of FIG. 10.

FIGS. 10–13 show schematically in cross-section the two step/shot molding process. In FIGS. 10 and 11, FIG. 11 being an enlarged view of part of FIG. 10, inner core pin 128 and outer core pin 122 are shown withdrawn from the cavities and it will be noted that diameters are selected to overlap portions of the cavities 102, 104 as more fully described herein.

More particularly as shown in FIG. 11, the outer diameter of outer core pin 122 the axial extent of which is shown also by dotted line A, is slightly greater than the diameter of the cavity 102 that defines the outer periphery of seal collar 76 at 136 thereby defining a gap 134. Further, the outer diameter of inner core 128 the axial extent of which is shown also by dotted line B, is slightly greater than the width of the cavity 104 to form the upper portion 40 of prong 36 at 137 thereby defining a gap 138.

Gaps 134 and 138 are both effectively closed by the peripheral outer edges of the bottom of core pins 122 and 128 respectively during molding of the seal 14 thereby preventing any of the seal material from entering the mold cavity 104 of the rigid fastener part.

Figure 12:
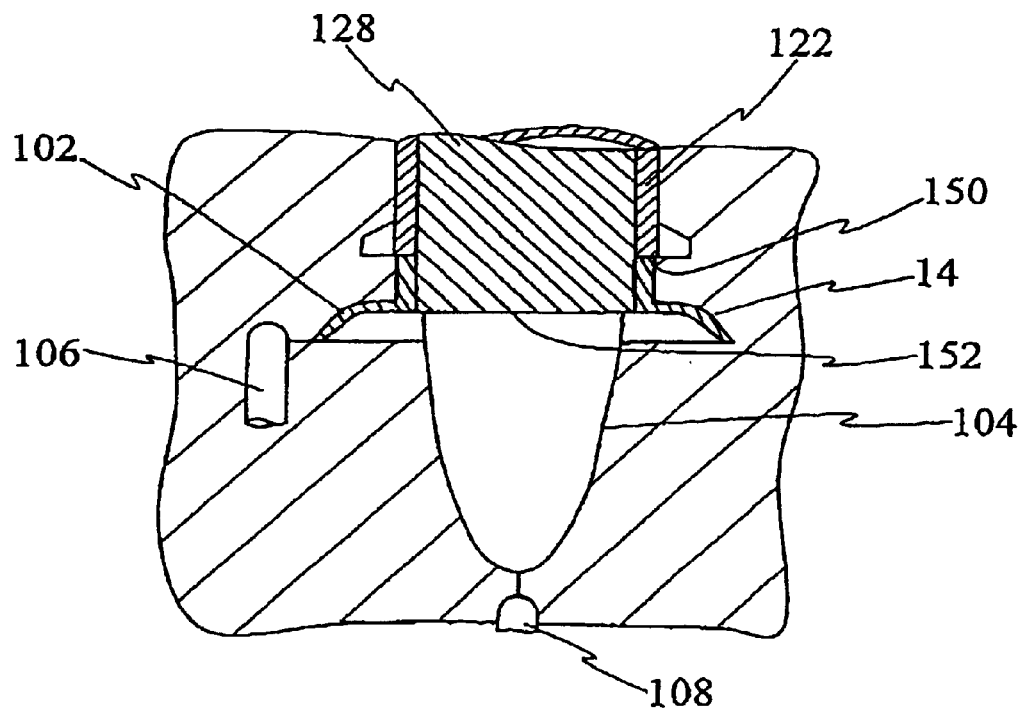
FIG. 12 is a view similar to that of FIG. 10 showing the location of the core pins when molding the seal part of the fastener device.
Figure 13:
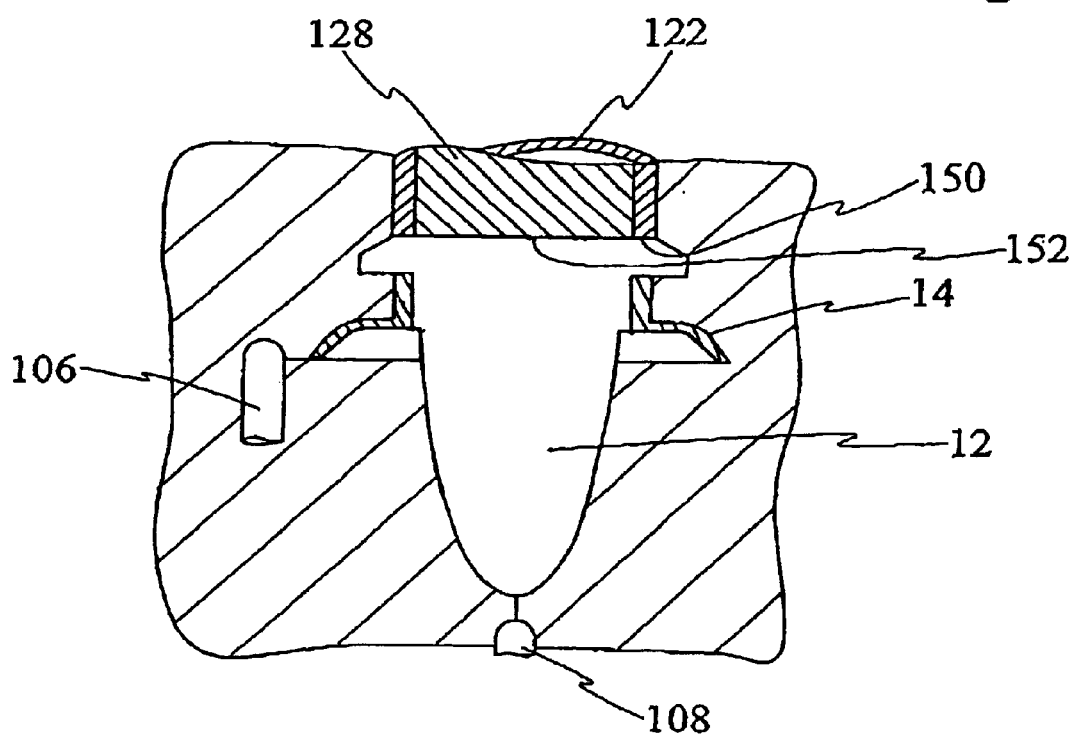
FIG. 13 is a view similar to that of FIG. 10 wherein the core pins have been withdrawn in the molding of the rigid part of the fastener device.

In fabricating or molding fastener device 10 with the fastener 12 and attached seal 14, core pins 122 and 128 are initially located as shown in FIG. 12, the bottom 150 of outer core pin 122 overlapping and closing off gap 134 and the bottom 152 of inner core pin 128 overlapping and closing off gap 138. Material for flexible seal 14 is then injected through duct 106 into cavity 102 with gaps 134, 138 closed off by the respective bottoms 150, 152 of outer core pin 122 and inner core pin 128. Seal material fills seal cavity 102 but is prevented from entering any portion of the fastener cavity 104 by the core pins 122, 128. Once the seal 14 is molded, core pins 122, 128 are retracted so that their bottoms 150, 152 are level with the upper roof 160 of the fastener cavity 104 as shown in FIG. 13. Material to form the rigid fastener 12 is then injected through duct 108 into cavity 104 and it flows into the area of prongs 30, through already molded collar 76 of seal 14 and into the rest of the cavity 104 to form head 16 (or 16*a*). The bottom 150, 152 of core pins 122, 128 close off the top of cavity 104 during molding of rigid part 12.

Injection of fastener part 12 material is halted and the formed fastener 10, (10*a*) with the rigid fastener part 12 and the fully attached and secure flexible seal 14, is ejected.

Accordingly, the mold 100 is designed so that the first shot or step is the injection of seal material with the core pins 122, 128 blocking off material flow to all portions of the fastener cavity so that material flow of selected seal material into the mold initially forms the seal 14. Then the core pins 122, 128 are withdrawn and the rigid portion 12 of the fastener device 10, (10*a*), including the head 16, (16*a*) prong or stem 30 and the cylindrical neck 34 are molded with different material without removing the molded seal 14 from the mold. The rigid material is injected in effect through the collar 76 of seal 14, the inner periphery of the collar defining a passageway for material to flow between the prong portion 30 and head 16 and also defining the peripheral extent of neck 34.

Accordingly a very effective fastener is formed from a two-shot or two-step molding technique, the rigid part 12 including the head 16, neck 34 and prong 30 of a strong rigid material whereas the flexible seal 14 is of a different material, more suitable for its purpose. Yet the first material effectively defines a portion of the shape or configuration of the second part during molding of the second part.

Although the invention contemplates variations in the material of the fastener parts, a preferred material for the rigid material for fastener 12 including the head, neck and prong is ST801™, a super tough nylon 66 resin from Dupont. Material for the seal 14 is preferably a flexible nylon or Santoprene®, (also known as Xantoprene®).

In prior art fasteners such as Seckerson noted above, the outer portion of the seal flange portion was flexible primarily due to the thinness of the peripheral edge but the material of the portion of the seal flange which was adjacent the actual peripheral of the aperture to which the clip is connected, was generally more rigid and less effective as a seal. In the present invention, the seal material of collar 76 is bound securely to the neck 34 and there is no movement of the seal material so that the portion of the seal material adjacent an aperture tends to be squeezed about the aperture providing an effective seal. In other words, the seal material extends radially inwardly slightly of the periphery of the aperture and when the fastener is in place, seal material tends to be forced into the aperture slightly, providing a much more effective seal around the periphery of the aperture.

It will also be appreciated that the skirt seal is permanently associated with the fastener and will not become separated in transit and requires no separate assembly of the seal to the fastener neck over the prongs, a process which can cause damage often to some of the seals.

It will be apparent that the invention is not limited to the particular shape or configuration of the head or the shape of or configuration of the prong or prong elements as illustrated in the drawings, but is applicable to other various shapes which are adaptable to being molded in the two shot or step manner as set forth herein.

What is claimed is:

1. A method of fabricating a device having at least two parts molded of different materials, comprising:

providing a mold cavity having at least three cavities, a first cavity defining a configuration of a first part of said device, a second cavity defining a configuration of a second part of said device and a third cavity defining a configuration of a third part of said device, said cavities initially being in flow communication with each other with flow communication between said first and third cavities being through said second cavity;

temporarily closing off said first and third cavities from said second cavity including closing flow communication between said first and third cavities;

injecting a first material into said second cavity to mold the second part of said device;

opening flow communication between said first and third cavities;

injecting a second material into said first and third cavities, said second material flowing between said first and third cavities through at least one portion of the second part of the device as molded wherein said at least one portion of said second part effectively defines a passageway for said second material between said first and second cavities to form said first and third parts of said device;

ejecting said device from the mold cavity whereby said device as molded has parts of different materials molded sequentially together.

2. The method of claim 1 wherein said device is a fastening device comprising a head portion, a neck portion and a fastening element, and a seal portion, said seal portion being molded of said first material in said second cavity, said head portion and said fastening element being molded of said second material in said first and third cavities, said neck portion being formed of said second material within and defined by a part of said seal portion.

3. The method of claim 2, wherein the first material is less rigid than the second material.

* * * * *